United States Patent
Dolog et al.

(10) Patent No.: US 10,465,064 B2
(45) Date of Patent: Nov. 5, 2019

(54) WEAR RESISTANT AND HIGH TEMPERATURE RESISTANT ELASTOMER NANOCOMPOSITES

(71) Applicants: Rostyslav Dolog, Houston, TX (US); Darryl Ventura, Houston, TX (US); Valery N. Khabashesku, Houston, TX (US)

(72) Inventors: Rostyslav Dolog, Houston, TX (US); Darryl Ventura, Houston, TX (US); Valery N. Khabashesku, Houston, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 12 days.

(21) Appl. No.: 15/708,416

(22) Filed: Sep. 19, 2017

(65) Prior Publication Data

US 2018/0086901 A1 Mar. 29, 2018

Related U.S. Application Data

(60) Provisional application No. 62/398,661, filed on Sep. 23, 2016.

(51) Int. Cl.
| | |
|---|---|
| *C08L 9/02* | (2006.01) |
| *F16J 15/3284* | (2016.01) |
| *C08L 9/00* | (2006.01) |
| *C08L 9/06* | (2006.01) |
| *C08L 15/00* | (2006.01) |

(52) U.S. Cl.
CPC ............ *C08L 9/02* (2013.01); *C08L 9/00* (2013.01); *C08L 9/06* (2013.01); *C08L 15/005* (2013.01); *F16J 15/3284* (2013.01); *C08L 2205/025* (2013.01)

(58) Field of Classification Search
CPC .............................. C08L 9/02; F16J 15/3284
USPC ........................................................ 524/432
See application file for complete search history.

(56) References Cited

U.S. PATENT DOCUMENTS

| | | | | |
|---|---|---|---|---|
| 5,973,053 | A * | 10/1999 | Usuki | C01B 33/44 523/216 |
| 8,415,426 | B1 | 4/2013 | Hua et al. | |
| 2006/0100339 | A1* | 5/2006 | Gong | B82Y 30/00 524/445 |
| 2008/0121436 | A1* | 5/2008 | Slay | B82Y 30/00 175/371 |
| 2012/0059113 | A1 | 3/2012 | Pan et al. | |
| 2012/0289647 | A1 | 11/2012 | Koelle et al. | |
| 2013/0035437 | A1 | 2/2013 | Pan et al. | |
| 2013/0137822 | A1* | 5/2013 | Guan | B82Y 30/00 525/74 |
| 2015/0148477 | A1 | 5/2015 | Ma et al. | |

FOREIGN PATENT DOCUMENTS

WO   WO 2009/015453   *   2/2009

OTHER PUBLICATIONS

International Search Report and Written Opinion, International Application No. PCT/US2017/052624, dated Jan. 2, 2018, Korean Intellectual Property Office; International Search Report 3 pages, Written Opinion 7 pages.

* cited by examiner

*Primary Examiner* — Deve V Hall
(74) *Attorney, Agent, or Firm* — Cantor Colburn LLP

(57) ABSTRACT

An elastomer nanocomposite comprises an elastomer comprising a non-functionalized first elastomer and a functionalized second elastomer and a functionalized filler crosslinked with the elastomer, wherein the non-functionalized first elastomer and the functionalized second elastomer are independently an ethylene-propylene-diene monomer rubber; a nitrile butadiene rubber; a hydrogenated nitrile butadiene rubber; a butadiene rubber; a styrene-butadiene rubber; an acrylonitrile butadiene rubber; an acrylate-butadiene rubber; a natural rubber; a polyisoprene rubber; a polychloroprene rubber; an ethylene-vinyl acetate rubber; a polypropylene oxide rubber; a polypropylene sulfide rubber; a fluoroelastomer; a perfluoroelastomer; a polyurethane rubber, or a functionalized derivative thereof.

22 Claims, 2 Drawing Sheets

WEAR RESISTANT AND HIGH TEMPERATURE RESISTANT ELASTOMER NANOCOMPOSITES

CROSS REFERENCE TO RELATED APPLICATIONS

This application claims the benefit of an earlier filing date from U.S. Provisional Application Ser. No. 62/398,661 filed Sep. 23, 2016, the entire disclosure of which is incorporated herein by reference.

BACKGROUND

Elastomers are used in applications as diverse as packer elements, blow out preventer elements, O-rings, gaskets, and the like. For dynamic seal applications, elastomers are used in situations involving reciprocating, rotating or oscillating motion, where abrasion and wear are the most common causes of failure. In addition, in downhole drilling and completion, elastomers are often exposed to high pressure, high temperature, harsh chemical and mechanical subterranean environments that can degrade elastomer performance over time, reducing their reliability. Thus, in the oil and gas industry, it is desirable for the elastomers to have optimal wear resistance and abrasion resistance. It would be a further advantage if the elastomers have good tensile strength and good chemical resistance at elevated temperatures.

BRIEF DESCRIPTION

An elastomer nanocomposite comprises an elastomer comprising a non-functionalized first elastomer and a functionalized second elastomer and a functionalized filler crosslinked with the elastomer, wherein the non-functionalized first elastomer and the functionalized second elastomer are independently an ethylene-propylene-diene monomer rubber; a nitrile butadiene rubber; a hydrogenated nitrile butadiene rubber; a butadiene rubber; a styrene-butadiene rubber; an acrylonitrile butadiene rubber; an acrylate-butadiene rubber; a natural rubber; a polyisoprene rubber; a polychloroprene rubber; an ethylene-vinyl acetate rubber; a polypropylene oxide rubber; a polypropylene sulfide rubber; a fluoroelastomer; a perfluoroelastomer; a polyurethane rubber, or a functionalized derivative thereof.

Also disclosed is an article comprising the elastomer nanocomposite.

BRIEF DESCRIPTION OF THE DRAWINGS

Referring now to the drawings wherein like elements are numbered alike in the several Figures.

DETAILED DESCRIPTION

Figure 1:
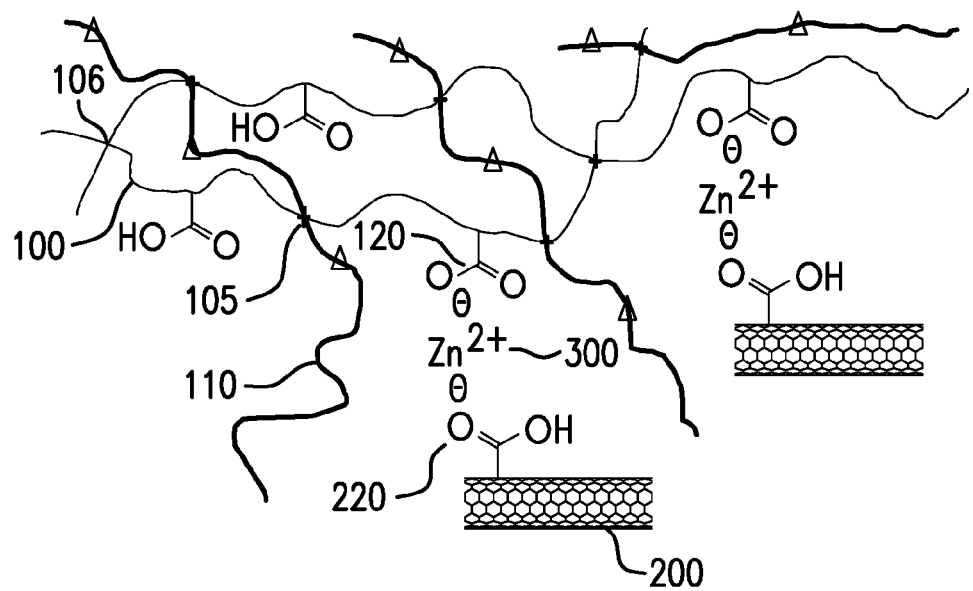
FIG. 1 illustrates the crosslinking of functionalized carbon nanotubes with XHNBR/HNBR via a metal cation.

There have been numerous efforts to develop elastomer nanocomposites in both academia and industry due to their attractive properties. However, some challenges include insufficient dispersion of nanofillers and inefficient load transfer from elastomer matrix to nanofiller. The inventors hereof disclose a novel elastomer nanocomposite having a highly efficient load transfer between the elastomer and the filler by crosslinking the elastomer with the filler.

The elastomer in the downhole article includes a non-functionalized first elastomer and a functionalized second elastomer. The first and second elastomers are independently an ethylene-propylene-diene monomer rubber; a nitrile butadiene rubber; a hydrogenated nitrile butadiene rubber; a butadiene rubber; a styrene-butadiene rubber; an acrylonitrile butadiene rubber; an acrylate-butadiene rubber; a natural rubber; a polyisoprene rubber; a polychloroprene rubber; an ethylene-vinyl acetate rubber; a polypropylene oxide rubber; a polypropylene sulfide rubber; a fluoroelastomer; a perfluoroelastomer; a polyurethane rubber; or a functionalized derivative thereof. Ethylene-propylene-diene monomer rubber, a nitrile butadiene rubber, a hydrogenated nitrile butadiene rubber, a styrene-butadiene rubber, and a functionalized derivative thereof are specifically mentioned. As used herein, the non-functionalized elastomer can include two or more non-functionalized elastomers. Similarly, the functionalized elastomer can include two or more functionalized elastomers.

Nitrile butadiene rubber (NBR) is a family of unsaturated copolymers of 2-propenenitrile and various butadiene monomers (1,2-butadiene and 1,3-butadiene). Although its physical and chemical properties vary depending on the elastomer's content of acrylonitrile (the more acrylonitrile within the elastomer, the higher the resistance to oils but the lower the flexibility of the material), this form of synthetic rubber is generally resistant to oil, fuel, and other chemicals.

Exemplary fluoroelastomers and perfluoroelastomers include those in the FKM family and marketed under the tradename VITON (available from FKM-Industries), perfluoroelastomers such as FFKM marketed under the tradename KALREZ (available from DuPont), and tetrafluoroethylene-propylene elastomeric copolymers such as those marketed under the tradename AFLAS and marketed by Asahi Glass Co.

Functionalized elastomers are elastomers that have been chemically modified to include one or more functional groups such as a hydroxyl, amino, ether, ester, amide, sulfonate, sulfonic acid, carboxyl, or carboxylate group. Carboxylic acid groups, carbonate groups, or a combination thereof are specifically mentioned. The presence of functional groups on the elastomers can facilitate the crosslinking between the elastomers and the functionalized fillers. In an embodiment, the functionalized elastomers include one or more of the functional groups covalently bonded to the backbone of the elastomer, either directly or via a moiety such as an alkyl group.

Derivatives of NBR include carboxylated NBR (XNBR), carboxylated hydrogenated NBR (XHNBR), and NBR with some of the nitrile groups substituted by an amide group (referred to as amidated NBR or ANBR), or a combination comprising at least one of the foregoing. Suitable, but non-limiting examples of NBR and its derivatives include, but are not limited to NIPOL 2020, NIPOL 1072 XNBR available from ZEON Chemicals, LP; THERBAN XT KA 8889 XHNBR and THERBAN 4307 HNBR available from LANXESS.

Derivatives of ethylene-propylene-diene monomer rubber (EPDM) include maleated EPDM, hydroxylated EPDM, sulfonated EPDM, or a combination comprising at least one of the foregoing.

Derivatives of the styrene-butadiene rubber (SBR) include sulfonated SBR, carboxylated SBR, or a combination comprising at least one of the foregoing.

In an embodiment, the non-functionalized first elastomer includes NBR, hydrogenated NBR, EPDM, SBR, or a combination thereof; and the functionalized second elastomer includes carboxylated NBR, carboxylated hydrogenated NBR, amidated NBR, maleated EPDM, hydroxylated EPDM, sulfonated EPDM, sulfonated SBR, carboxylated SBR, or a combination thereof.

The relative weight ratio of the non-functionalized first elastomer relative to the functionalized second elastomer is about 200:1 to about 3:1, about 99:1 to about 5:1, about 95:5 to about 60:40, about 95:5 to about 70:30, or about 95:5 to about 85:15.

Optionally the elastomer is crosslinked with itself. A crosslinked elastomer includes the crosslinking between the non-functionalized first elastomers, crosslinking between the functionalized second elastomers, and/or the crosslinking between the non-functionalized first elastomer and functionalized second elastomer.

Peroxides, sulfur, sulfur donors or other know crosslinking agents can be used. Exemplary peroxides include bis-(2,4-dichlorobenzyl) peroxide, dibenzoyl peroxide, bis(4-chlorobenzoyl) peroxide, 1,1-bis(1-butylperoxy)-3,3,5-trimethylcyclohexane, ter-butyl perbenzoate, 2,2-bis(t-butylperoxy)butane, 4,4-di-tert-butyl peroxynonylvalerate, 2,5-dimethyl-2,5-di(tert-butylperoxy)hexane, or a combination comprising at least one of the foregoing. The amount of peroxides is about 1 phr about 15 phr or about 5 phr to about 10 phr. Sulfur donors are derivatives of thiuram such as tetramethylthiuram disulfide, tetraethylthiuram disulfide, tetrabutylthiuram disulfide and tetrabenzylthiuram disulfide. The sulfur donor can be used together with other sulfur-containing compounds. Accelerators such as mercaptobenzothiazole or mercaptobenzothiazyl disulfide or sulfonamide type can be used together with sulfur or sulfur donors. The amount of sulfur or sulfur donors is about 0.1 phr to about 5 phr or about 0.1 phr to about 3 phr. As used herein, phr means parts by weight per 100 parts by weight of the elastomer.

Functionalized filler refers to filler functionalized with one or more functional groups. Exemplary functionalized filler comprises functionalized carbon-based fillers and functionalized non-carbon-based fillers. The functionalized carbon-based fillers include one or more of the following: functionalized carbon nanotubes; functionalized carbon nanofiber; functionalized graphene; functionalized graphene oxide; functionalized graphite; functionalized carbon black; functionalized nanodiamonds; and functionalized fullerene. The functionalized non-carbon-based fillers include functionalized halloysites; functionalized clays; functionalized silicate; functionalized silica; functionalized polysilsequioxanes; functionalized metal nanowires, and functionalized silicon nanowires. Combinations of different filler materials can be used. Functionalized metal nanowires are not particularly limited. In an embodiment, silver, copper, gold, platinum, and pallidum can be the metal used in the functionalized metal nanowire. The functionalized clay, functionalized halloysites, functionalized silicate, and functionalized silica can be functionalized nanoclay, functionalized nanohalloysites, functionalized nanosilicate, or functionalized nanosilica. In an exemplary embodiment, the functionalized filler includes functionalized carbon nanotubes. Carbon nanotubes are tubular fullerene structures having open or closed ends and which may be inorganic or made entirely or partially of carbon, and may include also components such as metals or metalloids. Nanotubes, including carbon nanotubes, may be single walled nanotubes (SWNTs) or multi-walled nanotubes (MWNTs).

The functionalized fillers include a functional group comprising a sulfonate group, a phosphonate group, a carboxylate group, a carboxyl group, a sulfonic acid group, a phosphonic acid group, an amino group; a hydroxyl group; a thiol group, an alkyl group, or a combination comprising at least one of the foregoing functional groups.

As used herein, "functionalized fillers" include both non-covalently functionalized fillers and covalently functionalized fillers. Non-covalent functionalization is based on van der Walls forces, hydrogen bonding, ionic interactions, dipole-dipole interactions, hydrophobic or $\pi$-$\pi$ interactions. Covalent functionalization means that the functional groups are covalently bonded to the filler, either directly or via an organic moiety.

Any known methods to functionalize the fillers can be used. For example, surfactants, ionic liquids, or organometallic compounds having the functional groups comprising a sulfonate group; a phosphonate group; a carboxylate group; a carboxyl group; a sulfonic acid group; a phosphonic acid group; an amino group; a hydroxyl group; or a thiol group, or a combination comprising at least one of the foregoing can be used to non-covalently functionalize the fillers.

Various chemical reactions can be used to covalently functionalize the fillers. Exemplary reactions include, but are not limited to, oxidization, reduction, amination, free radical additions, CH insertions, cycloadditions, polymerization via a carbon-carbon double bond, or a combination comprising at least one of the foregoing. In some embodiments, the fillers are covalently functionalized. Covalently functionalized carbon-based fillers are specifically mentioned.

The filler can be in the particle form or fiber form. In an embodiment, the filler comprises nanoparticles. Nanoparticles are generally particles having an average particle size, in at least one dimension, of less than one micrometer. Particle size, including average, maximum, and minimum particle sizes, may be determined by an appropriate method of sizing particles such as, for example, static or dynamic light scattering (SLS or DLS) using a laser light source. Nanoparticles may include both particles having an average particle size of 250 nm or less, and particles having an average particle size of greater than 250 nm to less than 1 micrometer (sometimes referred in the art as "sub-micron sized" particles). In an embodiment, a nanoparticle may have an average particle size of about 1 to about 500 nanometers (nm), specifically 2 to 250 nm, more specifically about 5 to about 150 nm, more specifically about 10 to about 125 nm, and still more specifically about 15 to about 75 nm.

The functionalized filler can be present in an amount of about 0.5 part to about 60 parts, about 0.5 part to about 30 parts, about 2 parts to about 20 parts, or about 5 parts to about 15 parts by weight based on 100 parts by weight of the elastomer.

The elastomer nanocomposites can comprise crosslinks between elastomers, crosslinks between functionalized fillers, crosslinks between elastomers and functionalized fillers, or a combination comprising at least one of the foregoing. As used herein, crosslinks between the elastomers and functionalized fillers can include the crosslinks between the non-functionalized first elastomer and the functionalized filler, or the crosslinks between the functionalized second elastomer and the functionalized filler, or a combination thereof.

In an embodiment, the elastomer, the functionalized filler, or both the elastomer and the functionalized filler are crosslinked via a crosslinker comprising a metal ion. Exemplary metal ions include the ions of metals in Group 1 through Group 14 of the Periodic Table. The metal ions can be part of a metal salt or a metal oxide. In an embodiment, the metal ion include the ions of magnesium, calcium, strontium, barium, radium, zinc, cadmium, aluminum, gallium, indium, thallium, titanium, zirconium, or a combination comprising at least one of the foregoing. Specifically, the metal ions include the ions of one or more of the following metals: magnesium, calcium, barium, zinc, aluminum, titanium, or zirconium. More specifically the metal ions include the ions of one or more of the following metals: zinc, aluminum, or zirconium. Illustrative salts or oxides of these metals include zinc oxide, aluminum oxide, and zirconium tert-butoxide. Without wishing to be bound by theory, it is believed that there are two possible crosslinking mechanisms. One is the ionic crosslinking, which occurs as a result of achieving neutral charge in the composites among the functional groups of the elastomers, the functional groups of the functionalized fillers, and the multivalent metal ions. The other is the physical crosslinking due to dipole-dipole association. This association produces ionic aggregation, e.g., ionic clusters and provides multifunctional crosslinks. In another embodiment, the elastomer is crosslinked with an alkyl functionalized filler using a peroxide, sulfur, or sulfur donor as disclosed herein as the crosslinker. For example, an alkyl functionalized filler can be covalently bonded to the backbone of the elastomer via the alkyl functional group.

FIG. 1 illustrates the crosslinking of an elastomer with a functionalized filler in an elastomer nanocomposite according to an embodiment of the disclosure. As shown in FIG. 1, the elastomer includes functionalized elastomer 100, which contains functional groups 120 and non-functionalized elastomer 110. The functionalized elastomer 100 is crosslinked with the non-functionalized elastomer 110 at crosslinking sites 105. A polymer chain of the functionalized elastomer 100 is also crosslinked with another polymer chain of the functionalized elastomer 100 at crosslinking sites 106. Similarly, a polymer chain of the non-functionalized elastomer 110 is crosslinked with another polymer chain of the non-functionalized elastomer 110 (not shown). The functionalized filler includes carbon nanotubes 200 having functional group 220. The elastomer is crosslinked with the functionalized filler via metal ion 300.

Effective amounts of crosslinkers can be readily determined by one of ordinary skill in the art depending on factors such as the reactivity of the elastomers, the functionalized fillers, and the crosslinkers, the desired degree of crosslinking, and like considerations, and can be determined without undue experimentation. For example, the crosslinkers such as metal cations or a salt or oxide thereof can be used in amounts of about 0.1 to about 12 parts, or about 0.5 to 5 parts, or about 0.5 to 3 parts by weight, per 100 parts by weight of the elastomers.

In specific embodiments, the elastomer nanocomposite comprises about 50 wt. % to about 99 wt. % of a hydrogenated nitrile butadiene rubber as the non-functionalized first elastomer, about 1 wt. % to about 50 wt. % of a carboxylated hydrogenated nitrile butadiene rubber as the functionalized second elastomer, each based on the sum of the weights of the hydrogenated nitrile butadiene rubber and the carboxylated hydrogenated nitrile butadiene rubber; and carbon nanotubes functionalized with a carboxyl group, a carboxylate group, or a combination thereof as the functionalized filler, wherein the elastomer is crosslinked with the functionalized filler via a crosslinker that comprises a multivalent metal ion, the multivalent metal ion comprising at least one of $Zr^{4+}$; $Zn^{2+}$; or $Al^{3+}$. Optionally the hydrogenated nitrile butadiene rubber is crosslinked with the carboxylated hydrogenated nitrile butadiene rubber.

The nanocomposites can further comprise of various additives. "Additive" as used herein includes any compound added to the combination of the elastomers and the functionalized fillers to adjust the properties of the elastomer nanocomposites, for example an antioxidant, a plasticizer, a non-functionalized filler, or the like, provided that the additive does not substantially adversely impact the desired properties of the elastomer nanocomposites.

A processing aid is a compound included to improve flow, moldability, and other properties of the elastomer. Processing aids include, for example an oligomer, a wax, a resin, a fluorocarbon, or the like. Exemplary processing aids include stearic acid and derivatives, low molecular weight polyethylene, and the like. Combinations comprising at least one of the foregoing processing aids can be used.

Exemplary additives include non-functionalized filler. They can be the same filler as described herein for functionalized filler except the non-functionalized filler does not have any functional groups. Carbon black is specifically mentioned. The non-functionalized fillers can be present in an amount of about 10 parts to about 60 parts, about 25 parts to about 60 parts, or about 45 parts to about 55 parts by weight per 100 parts by weight of the elastomers.

The elastomer nanocomposites can have good tensile properties at elevated temperatures. In an embodiment, the elastomer nanocomposites have a tensile strength of about 900 psi to about 2500 psi or about 900 psi to about 1600 psi, determined according to ASTM D624 at a temperature of 325° F.

The elastomer nanocomposites can be used to make various articles. In an embodiment, the article is a downhole article. The articles can have improved mechanical properties, reliability, and thermal stability. The articles also have good chemical resistance. The articles can be a single component article or a multiple component article. Illustrative articles include seals, compression packing elements, expandable packing elements, O-rings, T-rings, gaskets, bonded seals, bullet seals, sub-surface safety valve seals, sub-surface safety valve flapper seals, dynamic seals, V-rings, back up rings, drill bit seals, electric submersible pump seals, blowout preventer seals, plugs, bridge plugs, wiper plugs, frac plugs, components of frac plugs, wiper plugs, swabbing element protectors, buoyant recorders, pumpable collets, blow out preventer elements, submersible pump motor protector bags, sensor protectors, sucker rods, sucker rod seals, sampling pad seals, pump shaft seals, tube seals, valve seals, seals for an electrical component, insulators for an electrical component, or seals for a drilling motor.

In an embodiment, the article is a dynamic seal. As used herein, dynamic seals refer to seals that provide a sealing interface between moving components or between a moving component and a stationary component. Typical motions of the moving components include reciprocating, oscillating, and rotation. In an embodiment, the dynamic seal is a seal that is subject to variable pressures and/or can rotate. The elastomer nanocomposites as disclosed herein can have excellent wear resistance even when subjected to an elevated temperature and various pressures. In addition, the elastomer nanocomposites can have improved modulus and tensile properties. Thus, a dynamic seal comprising the elastomer nanocomposites has more reliable performance and an extended lifetime as compared to dynamic seals made of conventional materials. The dynamic seals can be used in drilling applications. Accordingly, drill bits containing the dynamic seals are also disclosed.

A process of making the downhole article includes blending the elastomer, the functionalized filler, a first crosslinking agent, and any optionally additives, if present, shaping the blend; and crosslinking the functionalized filler with the elastomer to form the article. Shaping and crosslinking can occur simultaneously or sequentially.

The first crosslinking agent includes metal salts and/or metal oxides of a Group 1 through Group 14 metal. In an embodiment, the first crosslinking agent includes a salt or oxide of magnesium, calcium, strontium, barium, radium, zinc, cadmium, aluminum, gallium, indium, thallium, titanium, zirconium, or a combination comprising at least one of the foregoing. Specifically, the first crosslinking agent includes a salt or oxide of one or more of the following metals: magnesium, calcium, barium, zinc, aluminum, titanium, or zirconium. Illustrative first crosslinking agent includes zinc oxide, aluminum oxide, and zirconium tert-butoxide.

In the event that the elastomer comprises a non-functionalized first elastomer and a functionalized second elastomer, a second crosslinking agent may be present to facilitate the crosslinking between the first elastomer and the second elastomer. The second crosslinking agent includes a peroxide, sulfur, or a sulfur donor as disclosed herein.

The components can be mixed in a calendar mixing system, an internal mixer, an extruder (if injection molded) or a smaller internal mixer such as Brabender. Sonication is optionally used to ensure that a homogeneous blend is formed. Shaping includes molding, extruding, casting, foaming, and the like.

Crosslinking conditions include a temperature or pressure effective to bond the functionalized filler to the elastomer. In an embodiment, the temperature is 25° C. to 250° C., and specifically 50° C. to 175° C. The pressure can be less than 1 atmosphere (atm) to 200 atm, specifically 1 atm to 100 atm. A catalyst can be added to increase the reaction rate of bonding the functionalized filler to the elastomer.

The crosslinking between a non-functionalized first elastomer and a functionalized second elastomer can be conducted sequentially or simultaneously with the crosslinking between the elastomer and the functionalized filler. Preferably these crosslinking reactions are conducted simultaneously at a temperature of 25° C. to 250° C. or 50° C. to 175° C., and a pressure of 1 atm to 200 atm, specifically 1 atm to 100 atm.

The degree of crosslinking including the crosslinking between the elastomer and the functionalized filler and the crosslinking between the functionalized and non-functionalized elastomers can be regulated by controlling reaction parameters such as crosslinking temperature, crosslinking time, and crosslinking environment, for example, varying the relative amounts of the elastomer, the functionalized filler, and the crosslinking agent and curing co-agents, if present. Other additive co-agents may be used to control the scorch time of the rubber compound, crosslinking mechanism and the properties of resulting crosslinks.

The elastomer nanocomposites are further illustrated by the following non-limiting examples. Formulations of example materials were prepared by melt mixing for about 10 minutes in internal mixer without the use of the heating element, however, heat generated by shear mixing have caused an increase in temperature to 130° F. Formulations were based on the blends of HNBR and carboxylated HNBR, and contained carbon black as co-filler, and peroxide based curing system with a coagent. Chains of HNBR, carboxylated HNBR were crosslinked by common reactions that occur during curing of elastomer compounds with peroxide based curing system. Furthermore, carboxylated groups of XHNBR and functionalized CNTs were crosslinked via metal cations.

The materials used in the examples are described in Table 1.

TABLE 1

| Component | Chemical Description | Source, Vendor |
|---|---|---|
| HNBR | Hydrogenated butadiene acrylonitrile copolymer (THERBAN 4307) | LANXESS |
| XHNBR | Carboxylated, hydrogenated nitrile butadiene rubber (THERBAN XT KA 8889) | LANXESS |
| Carboxylated CNTs | Carboxylated carbon nanotubes | |
| ZnO | Zinc oxide | SIGMA-ALDRICH |
| Zr(Ot-Bu)$_4$ | Zirconium (IV) tert-butoxide | SIGMA-ALDRICH |

The components of Ex 1, Ex2, and CEx A as shown in Table 2 were blended and cured in the presence of a peroxide crosslinking agent.

TABLE 2

| Components | Unit | CEx A | Ex 1 | Ex 2 |
|---|---|---|---|---|
| HNBR | phr | 90 | 90 | 90 |
| XHNBR | phr | 10 | 10 | 10 |
| Carboxylated CNTs | Phr | 0 | 10 | 5 |
| ZnO | phr | 0 | 5 | 0 |
| Zr(Ot-Bu)$_4$ | phr | 0 | 0 | 5 |

Figure 2:
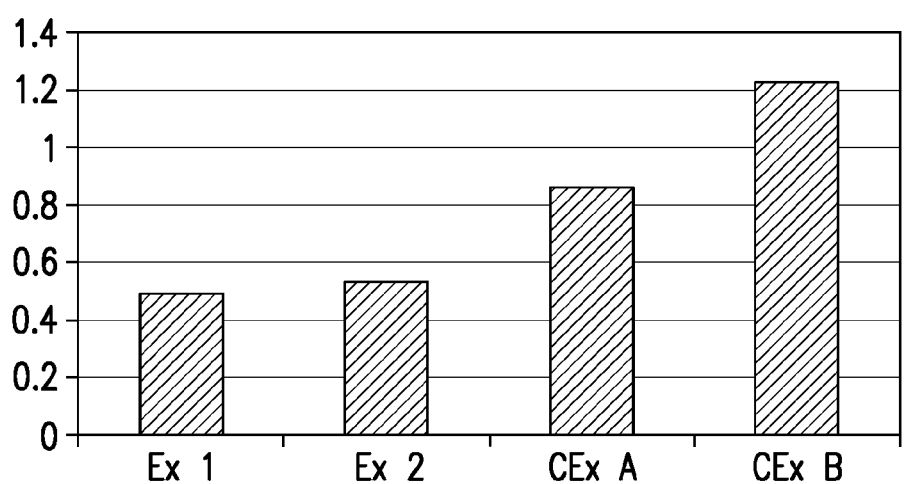
FIG. 2 shows the volume percent change of O-rings made from elastomer nanocomposites according to the disclosure and O-rings made from comparative elastomer compositions, after exposing the O-rings to an abrasive rotating alumina based disk for 30 minutes.

Wear resistance tests were conducted to determine the feasibility of using the elastomer nanocomposite for applications where abrasion and wear are the most common cause of failure. The tests were conducted by exposing at least two 329 O-rings made from Ex 1, Ex2, CEx A, and CEx B respectively to an abrasive rotating alumina based disk for 30 minutes. CEx B is a commercial product and is currently used in highly wear intensive applications. The volume loss of the samples was measured after the tests. The results are shown in FIG. 2. A lower volume loss indicates a better wear resistance. As shown in FIG. 2, samples made from Ex 1 have a volume loss of about 0.49%. In contrast, samples made from CEx A, which is a peroxide cured blend of HNBR and XHNBR with only carbon black as a filler, have a volume loss of about 0.86%. In addition, samples made from CEx B have a volume loss of about 1.23%, which is about 2.5 times the volume loss of Ex 1 sample.

Figure 3:
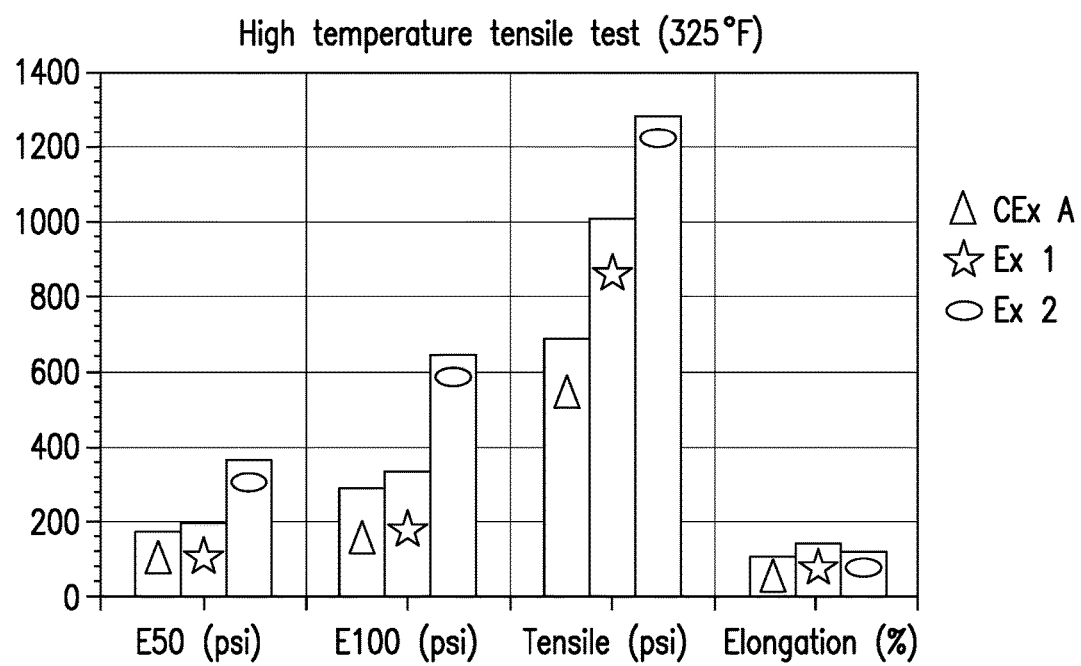
FIG. 3 shows the high temperature tensile test results of elastomer nanocomposites according to the disclosure and comparative elastomer compositions.

Tensile properties of the examples were assessed at 325° F., using MTS instruments, according to ASTM D624 standards. The results are shown in FIG. 3. The results indicate that Ex 1 and Ex 2 both have improved modulus and tensile strength at high temperatures such as 325° F. compared to CEx A, which do not have the carboxylated carbon nanotubes or the metal salt/oxide. Among Ex 1 and Ex 2, the elastomer nanocomposite having zirconium butoxide as the crosslinking agent (Ex 2) has further improved modulus and tensile properties as compared to the elastomer nanocomposite having zinc oxide as the crosslinking agent (Ex 1).

Set forth are various embodiments of the disclosure.

Embodiment 1

An elastomer nanocomposite comprising an elastomer comprising a non-functionalized first elastomer and a functionalized second elastomer; and a functionalized filler crosslinked with the elastomer; wherein the non-functionalized first elastomer and the functionalized second elastomer are independently an ethylene-propylene-diene monomer rubber; a nitrile butadiene rubber; a hydrogenated nitrile butadiene rubber; a butadiene rubber; a styrene-butadiene rubber; an acrylonitrile butadiene rubber; an acrylate-butadiene rubber; a natural rubber; a polyisoprene rubber; a polychloroprene rubber; an ethylene-vinyl acetate rubber; a polypropylene oxide rubber; a polypropylene sulfide rubber; a fluoroelastomer; a perfluoroelastomer; a polyurethane rubber, or a functionalized derivative thereof.

Embodiment 2

The elastomer nanocomposite of any prior embodiment, wherein the non-functionalized first elastomer is crosslinked with the functionalized second elastomer.

Embodiment 3

The elastomer nanocomposite of any prior embodiment, wherein the weight ratio of the non-functionalized first elastomer relative to the functionalized second elastomer is about 200:1 to about 3:1.

Embodiment 4

The elastomer nanocomposite of any prior embodiment, wherein the functionalized elastomer comprises one or more of the following: carboxylated nitrile butadiene rubber; carboxylated hydrogenated nitrile butadiene rubber; amidated nitrile butadiene rubber; maleated ethylene-propylene-diene monomer rubber; hydroxylated ethylene-propylene-diene monomer rubber; sulfonated ethylene-propylene-diene monomer rubber; carboxylated styrene-butadiene rubber; or sulfonated styrene-butadiene rubber.

Embodiment 5

The elastomer nanocomposite of any prior embodiment, wherein the non-functionalized first elastomer comprises one or more of the following: nitrile butadiene rubber; hydrogenated nitrile butadiene rubber; ethylene-propylene-diene monomer rubber; or styrene-butadiene rubber.

Embodiment 6

The elastomer nanocomposite of any prior embodiment, wherein the functionalized filler has a functional group comprising one or more of the following: a sulfonate group; a phosphonate group; a carboxylate group; a carboxyl group; a sulfonic acid group; a phosphonic acid group; an amino group; a hydroxyl group; a thiol group; or an alkyl group. Preferably, the functionalized filler comprises a carboxyl group, a carboxylate group, or a combination thereof.

Embodiment 7

The elastomer nanocomposite of any prior embodiment, wherein the functionalized filler comprises one or more of the following: functionalized carbon nanotubes; functionalized carbon nanofiber; functionalized graphene; functionalized graphene oxide; functionalized graphite; functionalized carbon black; functionalized nanodiamonds; functionalized fullerene; functionalized halloysites; functionalized clays; functionalized silicate; functionalized silica; functionalized polysilsequioxanes; functionalized metal nanowires; or functionalized silicon nanowires. Preferably, the functionalized filler comprises carbon nanotubes functionalized with a carboxyl group, a carboxylate group, or a combination thereof.

Embodiment 8

The elastomer nanocomposite of any prior embodiment, wherein the functionalized filler is present in an amount of about 0.5 part to about 60 parts by weight based on 100 parts by weight of the elastomer.

Embodiment 9

The elastomer nanocomposite of any prior embodiment, wherein the functionalized filler is crosslinked with the elastomer via a crosslinker comprising a metal ion of a metal in Group 1 through Group 14 of the Periodic Table. The metal ion includes one or more of the following: magnesium ions; calcium ions; strontium ions; barium ions; radium ions; zinc ions; cadmium ions; aluminum ions; gallium ions; indium ions; thallium ions; titanium ions; or zirconium ions. Preferably the metal ion is $Zr^{4+}$, $Zn^{2+}$, or $Al^{3+}$, or a combination thereof.

Embodiment 10

The elastomer nanocomposite of any prior embodiment, wherein the crosslinker is present in an amount of about 0.1 to about 12 parts per 100 parts by weight of the elastomer.

Embodiment 11

The elastomer nanocomposite of any prior embodiment, wherein the elastomer comprises about 50 wt. % to about 99 wt. % of a hydrogenated nitrile butadiene rubber as the non-functionalized first elastomer, and about 1 wt. % to about 50 wt. % of a carboxylated hydrogenated nitrile butadiene rubber as the functionalized second elastomer, each based on the sum of the weights of the hydrogenated nitrile butadiene rubber and the carboxylated hydrogenated nitrile butadiene rubber; the functionalized filler comprises carbon nanotubes functionalized with a carboxyl group, a carboxylate group, or a combination thereof; and the elastomer is crosslinked with the functionalized filler via a crosslinker that comprises a multivalent metal ion, the multivalent metal ion comprising at least one of $Zr^{4+}$; $Zn^{2+}$; or $Al^{3+}$. Optionally, the crosslinker is zinc oxide, zirconium tert-butoxide, or a combination thereof. In an embodiment, the hydrogenated nitrile butadiene rubber is crosslinked with the carboxylated hydrogenated nitrile butadiene rubber.

Embodiment 12

The elastomer nanocomposite of any prior embodiment, wherein the functionalized filler is an alkyl functionalized filler; and the alkyl functionalized filler is crosslinked with the elastomer using a peroxide, sulfur, or sulfur donor as a crosslinking agent.

Embodiment 13

The elastomer nanocomposite of any prior embodiment, further comprising about 10 parts by weight to about 60 parts by weight of a non-functionalized filler per 100 parts by weight of the elastomer.

Embodiment 14

An article comprising an elastomer nanocomposite, the elastomer nanocomposite comprising: an elastomer comprising a non-functionalized first elastomer and a functionalized second elastomer; and a functionalized filler crosslinked with the elastomer; the non-functionalized first elastomer and the functionalized second elastomer are each independently an ethylene-propylene-diene monomer rubber; a nitrile butadiene rubber; a hydrogenated nitrile butadiene rubber; a butadiene rubber; a styrene-butadiene rubber; an acrylonitrile butadiene rubber; an acrylate-butadiene rubber; a natural rubber; a polyisoprene rubber; a polychloroprene rubber; an ethylene-vinyl acetate rubber; a polypropylene oxide rubber; a polypropylene sulfide rubber; a fluoroelastomer; a perfluoroelastomer; a polyurethane rubber, or a functionalized derivative thereof

Embodiment 15

The article of any prior embodiment, where the article comprises a seal, a compression packing element, an expandable packing element, an O-ring, a T-ring, a gasket, a bonded seal, a bullet seal, a sub-surface safety valve seal, a sub-surface safety valve flapper seal, a dynamic seal, a V-ring, a back up ring, a drill bit seal, an electric submersible pump seal, a blowout preventer seal, a plug, a bridge plug, a wiper plug, a frac plug, a component of frac plug, a wiper plug, a swabbing element protector, a buoyant recorder, a pumpable collet, a blow out preventer element, a submersible pump motor protector bag, a sensor protector, a sucker rod, a sucker rod seal, a pump shaft seal, a tube seal, a valve seal, a sampling pad seal, a seal for an electrical component, an insulator for an electrical component, or a seal for a drilling motor.

Embodiment 16

The article of any prior embodiment, wherein the article is a dynamic seal. Advantageously, the dynamic seal provides a seal between two moving components or between a moving component and a stationary component.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. An elastomer nanocomposite comprising
   an elastomer comprising a non-functionalized first elastomer and a functionalized second elastomer; and
   a functionalized filler crosslinked with the elastomer;
   wherein the non-functionalized first elastomer and the functionalized second elastomer are each independently an ethylene-propylene-diene monomer rubber; a nitrile butadiene rubber; a hydrogenated nitrile butadiene rubber; a butadiene rubber; a styrene-butadiene rubber; an acrylonitrile butadiene rubber; an acrylate-butadiene rubber; a natural rubber; a polyisoprene rubber; a polychloroprene rubber; an ethylene-vinyl acetate rubber; a polypropylene oxide rubber; a polypropylene sulfide rubber; a fluoroelastomer; a perfluoroelastomer; or a polyurethane rubber; or a functionalized derivative thereof, and
   the non-functionalized first elastomer is crosslinked with the functionalized second elastomer.

2. The elastomer nanocomposite of claim 1, wherein the weight ratio of the non-functionalized first elastomer relative to the functionalized second elastomer is about 200:1 to about 3:1.

3. The elastomer nanocomposite of claim 1, wherein the functionalized elastomer comprises one or more of the following: carboxylated nitrile butadiene rubber; carboxylated hydrogenated nitrile butadiene rubber; amidated nitrile butadiene rubber; maleated ethylene-propylene-diene monomer rubber; hydroxylated ethylene-propylene-diene monomer rubber; sulfonated ethylene-propylene-diene monomer rubber; carboxylated styrene-butadiene rubber; or sulfonated styrene-butadiene rubber.

4. The elastomer nanocomposite of claim 1, wherein the non-functionalized first elastomer comprises one or more of the following: nitrile butadiene rubber; hydrogenated nitrile butadiene rubber; ethylene-propylene-diene monomer rubber; or styrene-butadiene rubber.

5. The elastomer nanocomposite of claim 1, wherein the functionalized filler has a functional group comprising one or more of the following: a sulfonate group; a phosphonate group; a carboxylate group; a carboxyl group; a sulfonic acid group; a phosphonic acid group; an amino group; a hydroxyl group; a thiol group, or an alkyl group.

6. The elastomer nanocomposite of claim 5, wherein the functionalized filler comprises a carboxyl group, a carboxylate group, or a combination thereof.

7. The elastomer nanocomposite of claim 1, wherein the functionalized filler comprises one or more of the following: functionalized carbon nanotubes; functionalized carbon nanofiber; functionalized graphene; functionalized graphene oxide; functionalized graphite; functionalized carbon black; functionalized nanodiamonds; functionalized fullerene; functionalized halloysites; functionalized clays; functionalized silicate; functionalized silica; functionalized polysilsesquioxanes; functionalized metal nanowires; or functionalized silicon nanowires.

8. The elastomer nanocomposite of claim 1, wherein the functionalized filler comprises carbon nanotubes functionalized with a carboxyl group, a carboxylate group, or a combination thereof.

9. The elastomer nanocomposite of claim 1, wherein the functionalized filler is present in an amount of about 0.5 part to about 60 parts by weight based on 100 parts by weight of the elastomer.

10. The elastomer nanocomposite of claim 1, wherein the functionalized filler is crosslinked with the elastomer via a crosslinker comprising a metal ion of a metal in Group 1 through Group 14 of the Periodic Table.

11. The elastomer nanocomposite of claim 10, wherein the metal ion includes one or more of the following: magnesium ions; calcium ions; strontium ions; barium ions; radium ions; zinc ions; cadmium ions; aluminum ions; gallium ions; indium ions; thallium ions; titanium ions; or zirconium ions.

12. The elastomer nanocomposite of claim 11, wherein the metal ion is $Zr^{4+}$, $Zn^{2+}$, or $Al^{3+}$, or a combination thereof.

13. The elastomer nanocomposite of claim 10, wherein the crosslinker is present in an amount of about 0.1 to about 12 parts per 100 parts by weight of the elastomer.

14. An elastomer nanocomposite comprising
an elastomer comprising about 50 wt. % to about 99 wt. % of a non-functionalized first elastomer which is a hydrogenated nitrile butadiene rubber, and about 1 wt. % to about 50 wt. % of a functionalized second elastomer, which is a carboxylated hydrogenated nitrile butadiene rubber, each based on the sum of the weights of the hydrogenated nitrile butadiene rubber and the carboxylated hydrogenated nitrile butadiene rubber; and
a functionalized filler comprising carbon nanotubes functionalized with a carboxyl group, a carboxylate group, or a combination thereof;
wherein the elastomer is crosslinked with the functionalized filler via a crosslinker that comprises a multivalent metal ion, the multivalent metal ion comprising at least one of $Zr^{4+}$; $Zn^{2+}$; or $Al^{3+}$.

15. The elastomer nanocomposite of claim 14, wherein crosslinker is zinc oxide, zirconium tert-butoxide, or a combination thereof.

16. The elastomer nanocomposite of claim 14, wherein the hydrogenated nitrile butadiene rubber is crosslinked with the carboxylated hydrogenated nitrile butadiene rubber.

17. An elastomer nanocomposite comprising
an elastomer comprising a non-functionalized first elastomer and a functionalized second elastomer; and
a functionalized filler crosslinked with the elastomer;
wherein the non-functionalized first elastomer and the functionalized second elastomer are each independently an ethylene-propylene-diene monomer rubber; a nitrile butadiene rubber; a hydrogenated nitrile butadiene rubber; a butadiene rubber; a styrene-butadiene rubber; an acrylonitrile butadiene rubber; an acrylate-butadiene rubber; a natural rubber; a polyisoprene rubber; a polychloroprene rubber; an ethylene-vinyl acetate rubber; a polypropylene oxide rubber; a polypropylene sulfide rubber; a fluoroelastomer; a perfluoroelastomer; or a polyurethane rubber; or a functionalized derivative thereof, wherein the functionalized filler is an alkyl functionalized filler; and the alkyl functionalized filler is crosslinked with the elastomer using a peroxide, sulfur, or sulfur donor as a crosslinking agent.

18. The elastomer nanocomposite of claim 1, further comprising about 10 parts by weight to about 60 parts by weight of a non-functionalized filler per 100 parts by weight of the elastomer.

19. An article comprising an elastomer nanocomposite of claim 14.

20. The article of claim 19, where the article comprises a seal, a compression packing element, an expandable packing element, an O-ring, a T-ring, a gasket, a bonded seal, a bullet seal, a sub-surface safety valve seal, a sub-surface safety valve flapper seal, a dynamic seal, a V-ring, a back up ring, a drill bit seal, an electric submersible pump seal, a blowout preventer seal, a plug, a bridge plug, a wiper plug, a frac plug, a component of frac plug, a wiper plug, a swabbing element protector, a buoyant recorder, a pumpable collet, a blow out preventer element, a submersible pump motor protector bag, a sensor protector, a sucker rod, a sucker rod seal, a pump shaft seal, a tube seal, a valve seal, a sampling pad seal, a seal for an electrical component, an insulator for an electrical component, or a seal for a drilling motor.

21. The article of claim 19, wherein the article is a dynamic seal.

22. The article of claim 21, wherein the dynamic seal provides a seal between two moving components or between a moving component and a stationary component.

* * * * *